United States Patent Office 3,208,283
Patented Sept. 28, 1965

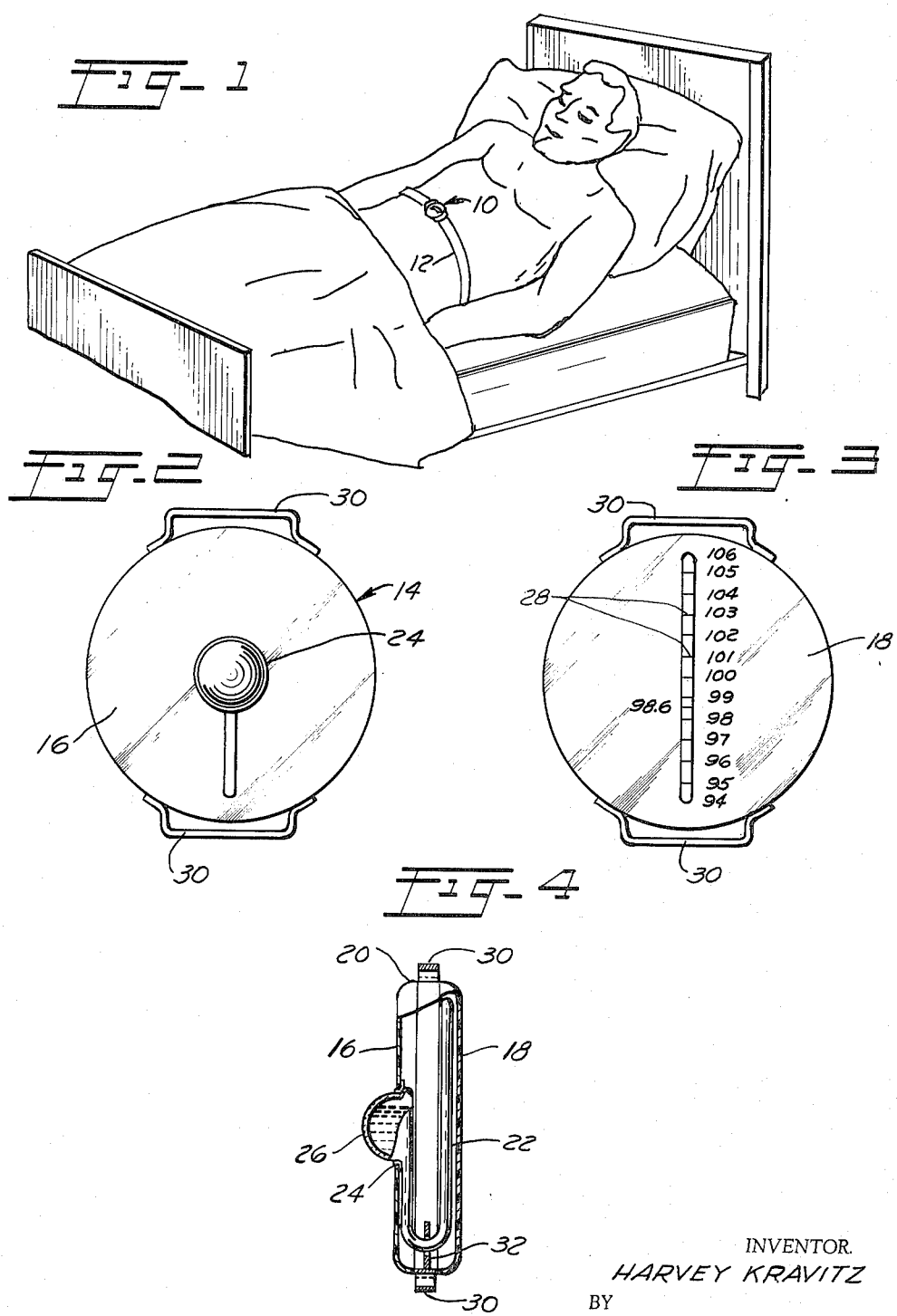

3,208,283
CLINICAL THERMOMETER
Harvey Kravitz, 9243 Avers Ave., Skokie, Ill.
Filed Jan. 7, 1963, Ser. No. 249,863
3 Claims. (Cl. 73—371)

This invention relates generally to temperature measuring and indicating devices and more particularly to a new and improved clinical thermometer of a type particularly adapted for determining the temperature of a person at a selected external skin surface.

Clinical thermometers of the prior art in common use by doctors, nurses and others, suffer from several disadvantages. Thus, the conventional clinical thermometer is formed of a linear, elongated fragile glass tube having an enlarged bulb at one end thereof. Normally this bulb contains mercury or the like adapted to rise through a capillary opening along the longitudinal axis of the tube to enable the temperature to be read by means of suitable graduations provided on the tube surface.

In the known use of such clinical thermometers, it has been common to insert the bulb end of the thermometer into a suitable body orifice—either oral or rectal—to measure the internal temperature of the patient. This technique frequently results in extreme discomfort to the patient and normally the thermometer cannot satisfactorily be maintained in the temperature measuring position for more than a short period of time. In addition, there is a danger to the patient of thermometer breakage and particularly when the thermometer is used with active children. Further difficulties arise from the fact that these conventional clinical thermometers normally require about three to five minutes to stabilize on an accurate reading, and from the frequent necessity of awakening patients during the night in order to take their temperatures.

In view of these problems, several attempts have been made in the past to provide clinical thermometers capable of measuring the skin temperature by contact with the skin surface, thereby eliminating the need for inserting the thermometer into a body orifice. Such attempts have not proved entirely successful since the temperature sensing devices generally have been adapted to be used on a flat outer skin surface which is subject to temperature variations due to air cooling effects. As such, a relatively large contact area has been required, leading to the use of such expedients as spirally wound tubes and the like.

Accordingly, it is a general object of the present invention to provide a new and improved clinical thermometer which overcomes the disadvantages of the prior art devices.

It is another object of this invention to provide an improved clinical surface thermometer which is adapted to be worn by a patient for long periods of time with comfort, and which permits instant observation of a patient's temperature, even during periods of sleep, so that the patient need not be awakened.

It is still another object of this invention to provide a new and improved clinical surface thermometer having a temperature sensing protrusion which is adapted to be securely and snugly fitted within an outer skin cavity such as the axilla or the umbilical recess of the patient's body.

It is a further object of this invention to provide a new and improved clinical thermometer, as above, which is adapted to be fitted within the axilla or umbilical recess and indicate accurately the body temperature of the patient due to the ability of the axilla or umbilical recess to prevent heat dissipation resulting from air currents acting on the surface of the body.

It is a still further object of this invention to provide a new and improved clinical thermometer adapted to selectively be used in the umbilical recess of the patient's body with a high degree of accuracy due to relatively higher body temperatures characteristic of the abdominal area resulting from the high degree of metabolic activity in this region.

It is another object of this invention to provide a new and improved clinical surface thermometer particularly adapted for axilla or umbilical use which is characterized by its safety of use as compared to the dangers inherent in the use of a relatively long and fragile oral or rectal thermometer.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a pictorial view of one application of a clinical thermometer embodying the present invention;

FIGURE 2 is a view of one wall face of the clinical thermometer of the present invention;

FIGURE 3 is a view of the opposite wall face of the clinical thermometer of FIGURE 2; and FIGURE 4 is an end view, partly broken away and in cross-section, of the clinical thermometer embodying the present invention.

While the present invention is adapted for advantageous use in either the axilla or the umbilical recesses of the body, for purposes of illustration, the drawings show a representative embodiment of clinical thermometer constructed in accordance with the invention as used for measuring the external skin temperature at the abdominal area of a patient. As shown in FIGURE 1, the inventive clinical thermometer 10 advantageously is maintained upon the abdominal area of the patient by suitable holding means, such as a belt 12 adapted to encircle the body of the patient so as to hold the clinical thermometer 10 in close contact with the skin of the patient. Those skilled in the art will appreciate that other means for holding the clinical thermometer 10 to the skin of the patient may be employed in lieu of the body encircling belt 12, and such other means may take the form of a suitable pressure adhesive tape or the like.

In accordance with a feature of this invention, the clinical thermometer 10 comprises an outer case 14 preferably formed of a thermally insulating material, such as plastic or the like. While the invention will be described hereinbelow with respect to the particular shape and configuration shown in FIGURES 2, 3 and 4 of the drawing, those skilled in the art will readily appreciate that the principles of the invention may be embodied in a case of any suitable shape or configuration, and are not intended to be limited to the specific form disclosed herein.

As shown in FIGURES 2, 3 and 4 of the drawings, the clinical thermometer case 14 comprises a pair of spaced apart wall surfaces 16 and 18, which in some embodiments may be substantially planar and parallel to each other. The opposing walls 16 and 18 are spaced from each other by an arcuate end wall 20 so as to form an enclosure for a thermometer stem 22 positioned within the case 14. The thermometer stem 22 may take the form of an elongated or plastic tube, as is well known in the art, which holds a suitable thermometer fluid, such as mercury or the like, therewithin. The case 14 is formed with a central opening 24 in the wall 16 thereof for a purpose to be explained hereinbelow.

Advantageously, the thermometer stem 22 is provided with a generally U-shaped configuration so that it may be fitted within the compact case 14. At one end of the thermometer stem 22 there is provided an enlarged bulb 26 which serves as a reservoir for the thermometer fluid. In accordance with a further feature of this invention, the enlarged bulb 26 of the thermometer stem extends through the central opening 24 of the casing wall 16, and protrudes therebeyond. Advantageously, a ring or washer 29 of resilient material such as sponge rubber may be positioned between the thermometer bulb 26 and the casing wall 16 at the opening 24 to cushion and protect the bulb 26. This is clearly shown in the end view of FIGURE 4 of the drawing. The other end of the thermometer stem has suitable graduations 28 marked thereon, corresponding to degrees of temperature, and the graduations 28 are associated with the numerical temperature indicia provided on the casing wall 18.

Advantageously, the casing wall 18 adjacent the graduated portion of the thermometer stem 28 may be provided with a transparent cover which advantageously may provide a magnifying function to facilitate the visual observation of a thermometer reading, or alternatively, a suitable opening may be formed in the casing wall 18 adjacent the thermometer stem 22 so as to facilitate the temperature reading.

In accordance with a unique feature of the present invention, the enlarged thermometer bulb 26 which protrudes from the casing wall 16 is shaped to be snugly fitted within the umbilical recess in the abdominal area of the patient's body. This provides many highly advantageous results. First, the nesting of the thermometer bulb 26 in the umbilical recess of the patient enables the thermometer device 14 to be firmly held in place in a temperature sensing position for long periods of time on the patient's body without causing discomfort to the patient. The thermometer reading can then be observed without awakening the patient, if he is sleeping; and the need for waiting three to five minutes to take the patient's temperature, as is required with normal thermometers, is eliminated. Manifestly, this results in a substantial saving of time for doctors, nurses, and other persons who would be required to take the patient's temperature.

In addition, the nesting of a thermometer bulb 26 in the umbilical recess provides an accurate, uniform and consistent check of a patient's temperature. The sensed area is not subject to the cooling effects of air currents, or other causes of temperature variation independent of the patient's body. Further, the fact that the abdominal area is characterized by a relatively higher body temperature, resulting from the high degree of metabolic activity in this region, insures a high degree of accuracy in the temperature reading. This arises from the fact that the temperatures within the umbilicus gives readings in closer agreement with the rectal temperature than that of the abdominal wall. This is so because there is no superficial fat or abdominal muscle layers covering the umbilicus.

Still further, the dangers inherent in present-day thermometers due to breakage in the patient's body, or the possibility of infection due to the common use of a present-day thermometer by several patients, is completely eliminated.

FIGURE 1 of the drawing illustrates the clinical thermometer of the present invention in one actual use by a patient. It will be appreciated by those skilled in the art that due to the relative softness of the abdominal area, the thermometer is not readily subject to breakage due to the rolling or tossing of the patient, and this is of great advantage when the thermometer is used with children, for example.

Preferably, the thermometer case 14 may be provided with suitable mounting means, such as the mounting members 30, to facilitate the wearing of the thermometer on the patient's body. Thus, the mounting means 30 may receive a belt, as shown in FIGURE 1, or alternatively, may receive a pressure sensitive adhesive tape so that the thermometer can be taped to the abdominal area of the patient's body. Those skilled in the art will realize that other types of mounting means may be employed to maintain the thermometer casing 14 in place on the patient's body, or, if desired, the thermometer case 14 may be manually held in place with the fingers.

While the present invention has particularly been illustrated herein as used with the umbilical recess of the body, those skilled in the art will readily appreciate that the inventive clinical thermometer also finds highly advantageous use in connection with the axilla recess of the body. Thus, the thermometer case may be placed under the arm of the patient such that the enlarged thermometer bulb which extends from the casing wall 16 is snugly fitted within the axilla to provide an accurate indication of the patient's body temperature. It will further be appreciated that the many advantages of the present invention as compared with the conventional clinical thermometers, as set forth in detail hereinabove, apply equally well to the use of the invention in the axilla.

In addition, the nesting of the inventive thermometer in the axilla in close contact with the skin surface, may be facilitated by the use of suitable mounting means such as those described above for maintaining the invention in the umbilical recess. Thus, the thermometer casing may be provided with a belt adapted to encircle the upper arm, or if desired, the upper body portion, of the patient so as to maintain the casing in temperature sensing position within the axilla. Alternatively, the thermometer casing may be provided with a pressure sensitive adhesive tape or manually held in the desired position to ensure the desired close contact of the thermometer bulb with the outer skin surface of the axilla.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a clinical thermometer apparatus particularly adapted for sensing and indicating the external skin temperature of the body comprising a casing formed of thermally insulating material, said casing further being formed with a pair of spaced wall surfaces, and a peripheral wall surface between said spaced wall surfaces to substantially enclose said casing, one of said spaced wall surfaces defining an opening centrally therein, said opening being of smaller cross-sectional area than the cross-sectional area of the wall surface surrounding said opening, an elongated thermometer stem positioned within said casing such that one extremity of said thermometer stem is adjacent said opening, said one extremity of the thermometer stem comprising an enlarged bulb forming a liquid storage reservoir, said enlarged bulb extending through said opening and being shaped to fit within a recess of the body for accurately sensing the temperature thereat, the other extremity of said thermometer stem being visually observable at the other wall surface of the casing, and temperature degree indicia associated with said other extremity of said thermometer stem for enabling the sensed external skin temperature to be determined.

2. The improvement of a clinical thermometer apparatus in accordance with claim 1 further comprising mounting means attached to said casing for maintaining the casing against the body with said bulb nested within said recess.

3. The improvement of a clinical thermometer apparatus particularly adapted for sensing and indicating the external skin temperature of the body comprising a casing formed of thermally insulating material, said casing further being formed with a pair of spaced wall surfaces, and a peripheral wall surface between said spaced wall surfaces to substantially enclose said casing, thermometer measuring means having a temperature sensing portion and a temperature indicating portion, said temperature measuring means being positioned within said casing such that said temperature sensing portion of the thermometer measuring means projects outwardly from one of said spaced wall surfaces to extend outside of said casing, said temperature sensing portion being located centrally of said one spaced wall surface and being shaped to fit within a recess of the body for accurately sensing the temperature thereat, the temperature indicating portion of said thermometer measuring means being visually observable at the other wall surface of the casing, and temperature degree indicia associated with said temperature indicating portion for enabling the sensed external skin temperature to be determined.

References Cited by the Examiner

UNITED STATES PATENTS

| | | | |
|---|---|---|---|
| 660,972 | 10/00 | Ryan | 73—343 |
| 1,590,613 | 6/26 | Benedict | 73—372 |
| 2,314,925 | 3/43 | Bengoa | 73—371 |
| 2,763,122 | 9/56 | Hayes | 58—152 |

FOREIGN PATENTS 588,621  2/25  France.

ISAAC LISANN, *Primary Examiner.*